United States Patent [19]
Byers et al.

[11] Patent Number: 5,488,702
[45] Date of Patent: Jan. 30, 1996

[54] DATA BLOCK CHECK SEQUENCE GENERATION AND VALIDATION IN A FILE CACHE SYSTEM

[75] Inventors: Larry L. Byers, Appley Valley; Joseba M. Desubijana, Minneapolis; Wayne A. Michaelson, Circle Pines, all of Minn.

[73] Assignee: UNISYS Corporation, Blue Bell, Pa.

[21] Appl. No.: 233,199

[22] Filed: Apr. 26, 1994

[51] Int. Cl.⁶ .................................................. G06F 11/34
[52] U.S. Cl. .................................................. 395/186; 371/53
[58] Field of Search ............................... 371/53, 40.1, 54, 371/48.1, 37.1; 395/575, 425, 725, 275, 186, 188.01, 185.01, 185.02, 185.05, 185.07

[56] References Cited

U.S. PATENT DOCUMENTS

| | | | |
|---|---|---|---|
| 3,825,903 | 7/1974 | Brown | 340/172.5 |
| 4,251,885 | 2/1981 | Dodt et al. | 371/60 |
| 4,531,213 | 7/1985 | Scheuneman | 371/3 |
| 4,920,538 | 4/1990 | Chan et al. | 371/19 |
| 5,128,944 | 7/1992 | Flaherty et al. | 371/29.1 |
| 5,157,669 | 10/1992 | Yu et al. | 371/37.7 |
| 5,233,616 | 8/1993 | Callander | 371/37.7 |

OTHER PUBLICATIONS

Shu Lin, "An Introduction to Error–Correcting Codes", 1972, pp. 3–7, 35–39.
John E. McNamara, "Technical Aspects of Data Communication", 1988, pp. 110–122.

*Primary Examiner*—Robert W. Beausoliel, Jr.
*Assistant Examiner*—Phung My Chung
*Attorney, Agent, or Firm*—Steve Skabrat; Mark Starr

[57] ABSTRACT

A system and method for detecting errors during the storage and retrieval of file information between a file cache system and a host computer system utilizes a block check sequence key as redundant data included in each block of file data transferred. The block check sequence key is generated by key generation logic and accompanies each block of file data stored in the file cache system by the host computer system. The block check sequence key is a compressed representation of the data within the selected block, as well as unique file and block identification information supplied by the requester of the write operation. When the block is retrieved from the file cache system, the system generates a new block check sequence key based on the data within the retrieved block and the unique file and block identification information supplied by the requester of the read operation. Validation logic ensures that if the retrieved key and the newly generated key does not match, an error signal is activated.

20 Claims, 13 Drawing Sheets

| | | | |
|---|---|---|---|
| WORD 0 | 0 | DATA | 15 |
| WORD 0 | 16 | DATA | 31 |
| WORD 1 | 0 | DATA | 15 |
| WORD 1 | 16 | DATA | 31 |
| ⋮ | | DATA | |
| | | DATA | |
| | | ⋮ | |
| ⋮ | | ⋮ | |
| WORD 29 | 0 | DATA | 15 |
| WORD 29 | 16 | DATA | 31 |
| WORD 30 | 0 | DATA | 15 |
| WORD 30 | 16 | DATA | 31 |
| WORD 31 | 0 | DATA | 15 |
| WORD 31 | 16 | BCS | 31 |

DATA BLOCK CHECK SEQUENCE GENERATION AND VALIDATION IN A FILE CACHE SYSTEM

CROSS REFERENCES TO RELATED APPLICATIONS

This application is related to the application listed below, the disclosure of which is incorporated herein by reference. The listed application is assigned to the same assignee as the present invention.

Outboard File Cache System, Docket Number RA-3247, Ser. No. 08/174,750, invented by Thomas Cooper and Robert E. Swenson, filed on Dec. 23, 1993.

BACKGROUND OF THE INVENTION

1. Field of the Invention

This invention relates generally to error detection techniques for storage access operations in multi-processor computer systems. More specifically, it relates to the generation and validation of error detection codes embedded in portions of data stored in a file cache system.

2. Background Information

In modern computer systems, data is continuously transferred between processors, peripherals, storage devices, and display devices. Errors may be introduced during the reading, writing, or actual transmission of this data. Consequently, error detection and control has become an integral part of the design of computer systems. Error detection methods typically involve the addition of one or more redundancy bits to the information-carrying bits of the data in order to detect the inevitable errors. These redundancy bits usually do not carry any information per se; they are merely used to determine the correctness of the bits carrying the information.

One form of data redundancy is the use of parity bits and simple parity checking. Parity is well known, and simply involves summing without carry the one bits in a data word and providing an additional parity bit that renders the total count across the data word, including the parity bit, either odd or even. Whenever a data word is transferred, the receiver generates a parity value for the received data word and compares it to the appended parity bit sent by the sender. If they do not match, a parity error has occurred and the data transferred is considered suspect. Simple parity schemes detect single bit errors, but do not detect the problem of multiple bit errors in the data word.

A form of two-dimensional parity checking used on some systems can detect and even correct some types of errors. The data words are arranged in a block of columns with an odd parity bit, called a vertical redundancy check (VRC), added to make the sum of the one bits in each column an odd number. Similarly, an odd parity-check bit, called the longitudinal redundancy check (LRC), is added at the end of the block for each row of bits. As each data block is read, the VRC and LRC are regenerated and compared to the embedded check values to detect any errors.

A more powerful error detecting method is cyclic redundancy checking (CRC). Here, all data words in a data block are treated as a serial string of bits representing a binary number. This number is divided modulo 2 by a predetermined binary number and the remainder of this division is appended to the data block as a cyclic redundancy check code. The embedded CRC code is compared with the code obtained in a similar fashion by the receiver of the data. If they agree, the data transfer is presumed to be correct. The CRC code is often called a cyclic check sum, or simply a checksum. Various methods of generating CRC codes are described in "Technical Aspects of Data Communication" by John E. McNamara, pp. 110–122, and "An Introduction to Error-Correcting Codes" by Shu Lin.

The redundancy schemes described above are useful for detecting transmission errors and thus guaranteeing some degree of integrity of the data retrieved from another component in a computer system. But in the most recently developed computer systems, merely guaranteeing correct transmission may not be enough to ensure fault tolerant operation. Consider the situation where a computer system's data is being stored on an outboard file cache system as described in co-pending application, Ser. No. 08/174,750, assigned to Unisys Corporation. In this system architecture, multiple requesters are concurrently reading and writing file data into the file cache. Checksums are used to detect transmission errors when storing or retrieving file data. Checksums, however, do not provide enough support for detecting errors occurring in the system microcode and hardware during file accesses. If a pointer to cached file data managed by the microcode is corrupted for some reason, an incorrect file access request may be made to the file cache. As a result, the wrong data may be retrieved and passed to the requester. This error will go undetected for some indeterminate amount of processing, until the requester, or a process receiving the file data from the requester, discovers that a catastrophic failure has occurred.

A new form of data redundancy providing improved error detection is needed to ensure that processes requesting access to file data stored in a file cache system obtain the correct file data. If incorrect file data is retrieved, this error must be detected at the earliest possible time, before propagation of the error throughout the system occurs.

SUMMARY OF THE INVENTION

An object of this invention is to improve the error detection capabilities of storage access operations in a multi-processor computer system.

Another object of this invention is to detect incorrect file accesses in a multiprocessor computer system at the earliest possible time.

Yet another object of the present invention is to implement an error detection mechanism which detects incorrect file access requests in the most efficient, least complex manner, by using a minimum of processing time, additional storage, and additional logic.

Still another object of the present invention is to detect incorrect requests for access to file data stored in a file cache system.

An additional object of this invention is to detect errors made by a requesting process in attempting to retrieve a block of data stored in a file cache system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a system for detecting errors occurring during the storage and retrieval of file information between a processor and a mass storage device. In this system, the unit of data transfer between the processor and the mass storage device is a block of file information of a predetermined number of blocks, each block containing a predetermined number of 32-bit words. Storage of file information is requested by a write requester and retrieval of file information is requested by a read requester. The system includes generation means coupled to the mass storage device for generating a key representing a selected block of a file. This key is generated from the block of file data and identification information of the file and the block supplied by a write requester. The block and its associated key are stored in the mass storage device. Validation logic is coupled to the mass storage device for retrieving the block and its key from the mass storage device and generating a new key representing the block that is retrieved. This new key is generated from the data in the block retrieved from the mass storage device and identification information of the file and the block supplied by a read requester. The validation means compares the new key to the key retrieved from the mass storage device and activates an error signal when the keys do not match.

In accordance with another aspect of the invention, a method for detecting errors occurring during the storage and retrieval of file information between a mass storage device in a file cache system and a host computer system is disclosed. In this method, each file contains multiple segments, each segment contains a predetermined number of blocks, and each block contains a predetermined number of data words. The unit of data transfer between the host computer system and the file cache system is one block. The storage of file information is requested by a write requester and the retrieval of file information is requested by a read requester. The method comprises the steps of generating, upon request by a write requester, a block check sequence key representing a selected block within a selected segment of a file. This block check sequence key is generated from the data in the selected block and identification information of the selected block, segment, and file supplied by the write requester. The selected block and its associated block check sequence key are stored in the mass storage device. Upon request by a read requester, the selected block and its block check sequence key is retrieved from the mass storage device. A new block check sequence key is generated from the block retrieved from the mass storage device and identification information for the selected block, segment, and file supplied by the read requester. The block check sequence retrieved from the mass storage device is then compared to the newly generated block check sequence key. If the keys do not match, an error signal is activated.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the scope of the invention. Accordingly, the drawings and description are to be regarded as illustrative in nature.

BRIEF DESCRIPTION OF THE DRAWINGS

In the Drawings:

FIG. 6 is a diagram illustrating the format of a block of data in the File Cache System.

DESCRIPTION OF THE PREFERRED EMBODIMENT

Figure 1:
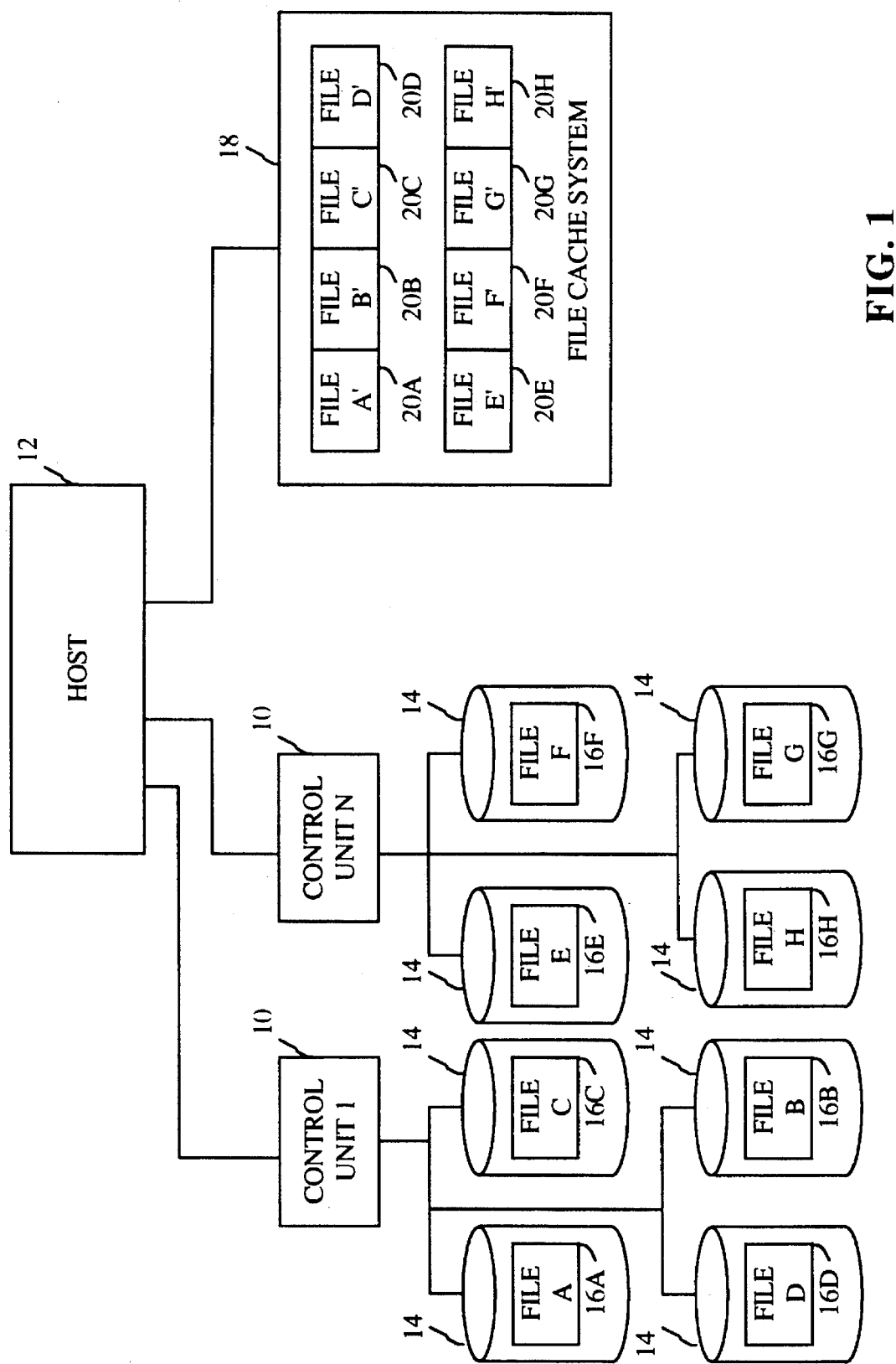
FIG. 1 is a diagram illustrating the environment in which this invention operates.

FIG. 1 is a diagram illustrating the environment in which this invention operates. In a typical large computer system, a plurality of Control Units 10 are coupled to a Host computer 12 for providing access to multiple mass storage Disks 14. In the preferred embodiment, the Host 12 is a 2200 Series computer system available from Unisys Corporation. Application and system software executing on Host 12 reads data from and writes data to Files 16A–H, which are stored on Disks 14. While Files 16A–H are depicted as blocks it should be understood that the data is not necessarily stored contiguously in Disks 14.

The File Cache System 18, of which the subject invention is a part, provides an intermediate storage capability for the Host 12 with a greatly improved file access time and resiliency against data loss which is comparable to Disks 14. The File Cache System is more fully described in co-pending application Ser. No. 08/174,750 and reference may be made to that application for a complete description of a system in which the present invention may be utilized. All or parts of active Files 16 may be stored in the File Cache System 18 depending on the storage capacity of the File Cache System 18, and the size and number of Files 16 selected by the system software on the Host 12 to be cached.

The portion of Files 16 that are stored in the File Cache System 18 are shown us blocks 20A–H. The cached portion of Files 16 are labelled File A', File B', . . . , File H' for discussion purposes. File A' 20A is the portion of File A that is stored in File Cache System 18; File B' 20B is the portion of File B that is stored in File Cache System 18: and so on. The existence of the File Cache System at this level of the storage hierarchy allows references to cached files to be immediately directed to the File Cache System for processing, in contrast to references to non-cached files where an Input/Output (I/O) channel program must be constructed on the Host 12 to access the proper Disk 14 via a Control Unit 10. The implementation of the File Cache System 18 reduces the path length that a request must travel in order to update a File 16. This reduced path length, coupled with the powerful processing capabilities of the File Cache System 18, results in shortened File access times.

Figure 2:
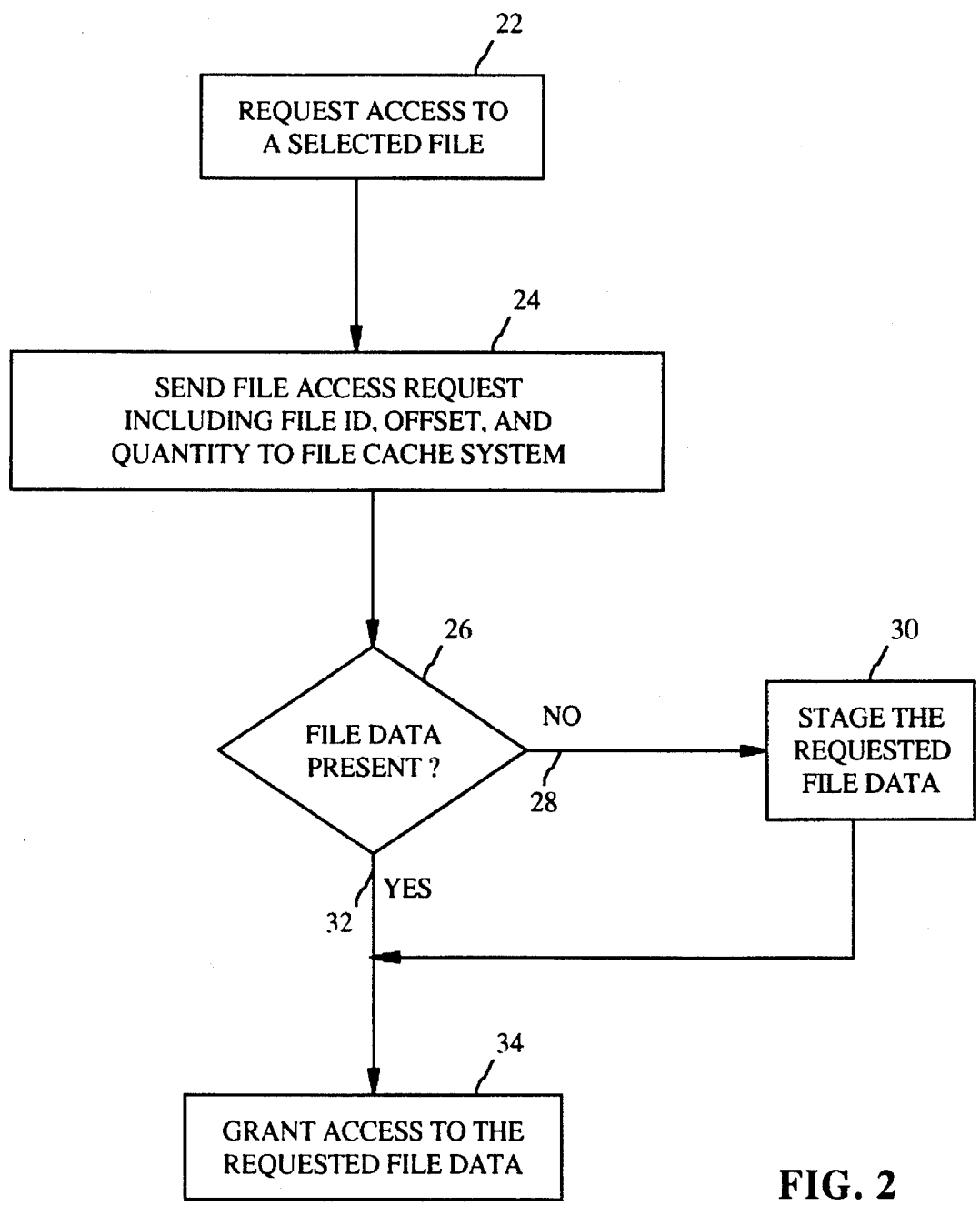
FIG. 2 is a flow chart showing how file accesses are accomplished within the File Cache System.

FIG. 2 is a flow chart showing how file accesses are accomplished within the File Cache System. The processing begins at Step 22 where application software executing on Host 12 requests access to a selected File. The access request may a request to read data from or write data to the selected File.

A File access request is sent to the File Cache System 18 at Step 24. The File access request contains a File identifier (ID), which specifies the File on which the read or write operation is to be performed; an offset from the beginning of the File, which specifies precisely where in the File the operation is to begin; and the quantity of data which is to be read from or written to the File. At Test 26, the File Cache System 18 uses the File ID, offset, and quantity to determine if the requested File data is already present in the File Cache System. If the requested File data is not present, then Path 28 is followed to Step 30, and the File Cache System 18 "stages" (reads) the requested File data from the appropriate File 16 on Disk 14 to the cached File 20 in the File Cache System. If the requested File data is present, Path 32 is followed to Step 34 where the File Cache System grants access to the requested File data.

Figure 3:
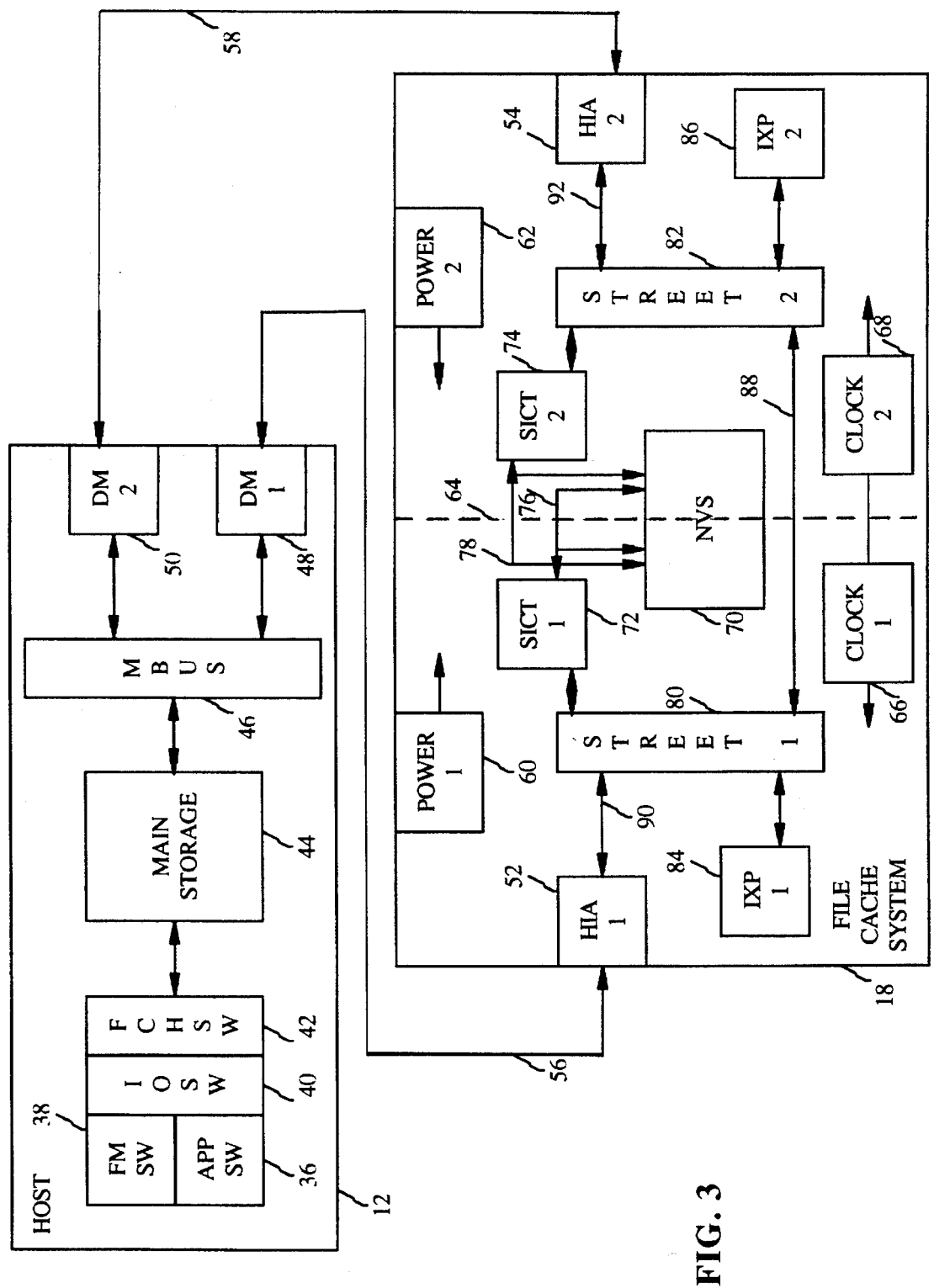
FIG. 3 is a functional block diagram of the hardware and software components of the File Cache System.

FIG. 3 is a functional block diagram of the hardware and software components of the File Cache System. The system is comprised of hardware and software elements in both the Host 12 and File Cache System 18. The software on Host 12 is shown by blocks 36, 38, 40, and 42. The blocks are joined to signify the interrelationships and interfaces between the software elements.

Application Software (APP SW) 36 provides data processing functionality to Host system 12 end users and includes applications such as financial transaction processing and airline reservations systems. Data bases maintained by Application Software 36 may be stored in one or more of the exemplary Files 16 as shown in FIG. 1. File Management Software (FM SW) 38, Input/Output Software (IO SW) 40, and File Cache Handler Software (FCH SW) 42 are all components of the Host's operating system software (not shown). In general, File Management Software 38 provides management of file control structures, and in particular handles the creating, deleting, opening, and closing of files.

Input/Output Software 40 provides the software interface to each of the various I/O devices coupled to the Host 12. The I/O devices may include network communication processors, magnetic disks, printers, magnetic tapes, and optical disks. Input/Output Software 40 builds channel programs, provides the channel programs to the appropriate I/O processor function within the Host 12, and returns control to the requesting software at the appropriate time.

File Cache Handler Software 42 coordinates the read and write accesses to cached files. In general, File Cache Handler Software 42 provides the operating system level interface to the File Cache System 18, "stages" (reads) File data from Disks 14 to the File Cache System 18, and "destages" (writes) File data from the File Cache System 18 to Disks 14. The File Cache Handler Software 42 provides File data and File access requests to the hardware interface to the File Cache System 18 via Main Storage 44. Main Storage 44 is coupled to an I/O bus called the M-Bus 46.

The Data Mover (DM) components 48, 50 provide the hardware interface to the File Cache System 18. While two DMs 48, 50 are shown, the system does not require two DMs for normal operations. A configuration with two DMs provides fault tolerant operation: that is, if one DM fails, the other DM is available to process File access requests. In alternate embodiments, there could be many DMs. Each DM 48, 50 is coupled to the M-Bus 46 of Host 12. File Cache Handler Software 42 distributes File access requests among each of the DMs 48, 50 coupled to M-Bus 46. If one DM fails, File access requests queued to that DM can be redistributed to the other DM.

The DMs 48, 50 perform the same general functions as an I/O processor, that is, they read data from and write data to a peripheral device. The DMs can also read from and write to Main Storage 44 via the M-Bus 44. The DMs 48, 50 coordinate the processing of File access requests between File Cache Handler Software 42 and the File Cache System 18 and transfer File data between Main Storage 44 and the File Cache System 18. Each of the DMs is coupled to a Host Interface Adapter (HIA) 52, 54 component within the File Cache System 18. DM 1 48 is coupled to HIA 1 52 by a Fiber Optic interface shown as Line 56, and DM 2 50 is coupled to HIA 2 54 by a second Fiber Optic Interface shown as Line 58.

The File Cache System 18 is configured with redundant power, redundant clocking, redundant storage, redundant storage access paths, and redundant processors for processing File access requests, all of which cooperate to provide a fault tolerant architecture for storing File data. The File Cache System 18 is powered by dual Power Supplies, Power 1 60 and Power 2 62. The portion of the File Cache System 18 to the left of dashed line 64 is powered by Power 1 60 and is referred to as Power Domain 1, and the portion of the File Cache System to the right of dashed line 64 is powered by Power 2 62 and is referred to as Power Domain 2. Each of the Power Supplies 1 and 2 has a dedicated battery and generator backup to protect against loss of the input power source.

Two separately powered Clocks 1 66 and 2 68 provide timing signals to all of the components of the File Cache System 18. Clock 1 66 provides timing to the components within Power Domain 1 and Clock 2 68 provides timing to the components within Power Domain 2. Redundant oscillators within each Clock provide protection against the failure of one, and Clocks 1 and 2 are synchronized for consistent timing across Power Domains 1 and 2.

The Non-Volatile Storage (NVS) component 70 includes multiple dynamic random access memory (DRAM) storage modules. Half of the storage modules are within Power Domain 1 and the other half are within Power Domain 2. The data stored in the storage modules in Power Domain 2 is identical to the data stored in storage modules in Power Domain 1. Thus, NVS 70 provides for the redundant storage of File data 20 and the control structures used by the File Cache System 18. The redundant storage organization supports both single and multiple bit error detection and correction.

The portion of NVS 70 within each of the Power Domains 1 and 2 is coupled to two Storage Interface Controllers (SICTs) 72, 74. While only two SICTs are shown in FIG. 3, each half of NVS 70 is capable of being addressed by up to four SICTs. Line 76 represents the coupling between SICT 1 72 and the portion of NVS 70 within each of Power Domains 1 and 2. Similarly, Line 78 represents the coupling between SICT 2 74 and NVS 70.

Read and write requests for NVS 70 are sent to the SICTs 72, 74 via local network Street 1 80 and Street 2 82. The Street provides data transfer and interprocessor communication facilities between the major components within the File Cache System 18. The Streets provide multiple requesters (HIA 1 52, HIA 2 54, Index Processor (IXP) 1 84, or IXP 2 86) with high-speed, high-bandwidth access to NVS 70, as well as multiple paths for redundant access. Crossover 88 provides a path whereby NVS 70 requests may be sent from Street 1 80 to Street 2 82, or visa versa, if a SICT 72, 74 is unavailable. For example, if SICT 1 72 fails, NVS requests sent from requesters (HIAs and IXPs) are sent to Street 2 82 via Crossover 88, whereby NVS 70 access is provided by SICT 2 74.

The It! As 52, 54 perform functions in the File Cache System 18 which are similar to the functions performed by the DMs 48, 50 on the Host 12. In particular, the HIAs receive File access requests sent from the DMs, write File data sent from the Host 12 to NVS 70, and read File data from NVS and send it to the Host. The HIAs also contain the logic for sending and receiving data over the Fiber Optic Interfaces 56, 58. HIA 1 52 interfaces with Street 1 80 over Line 90, and HIA 2 54 interfaces with Street 2 82 over Line 92.

Index Processor (IXP) 1 84 and IXP 2 86 manage allocation of the storage space available in NVS 70, service file access requests sent from Host 12, and generally provide for overall File Cache System management.

Figure 4:
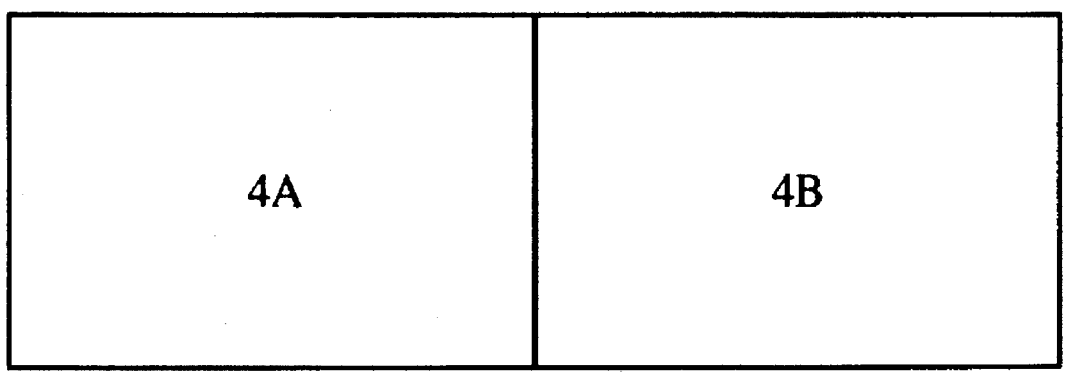
FIG. 4(A) and FIG. 4(B), when arranged as FIG. 4, are detailed block diagrams showing the components of a Data Mover and a Host Interface Adaptor.
Figure 4A:
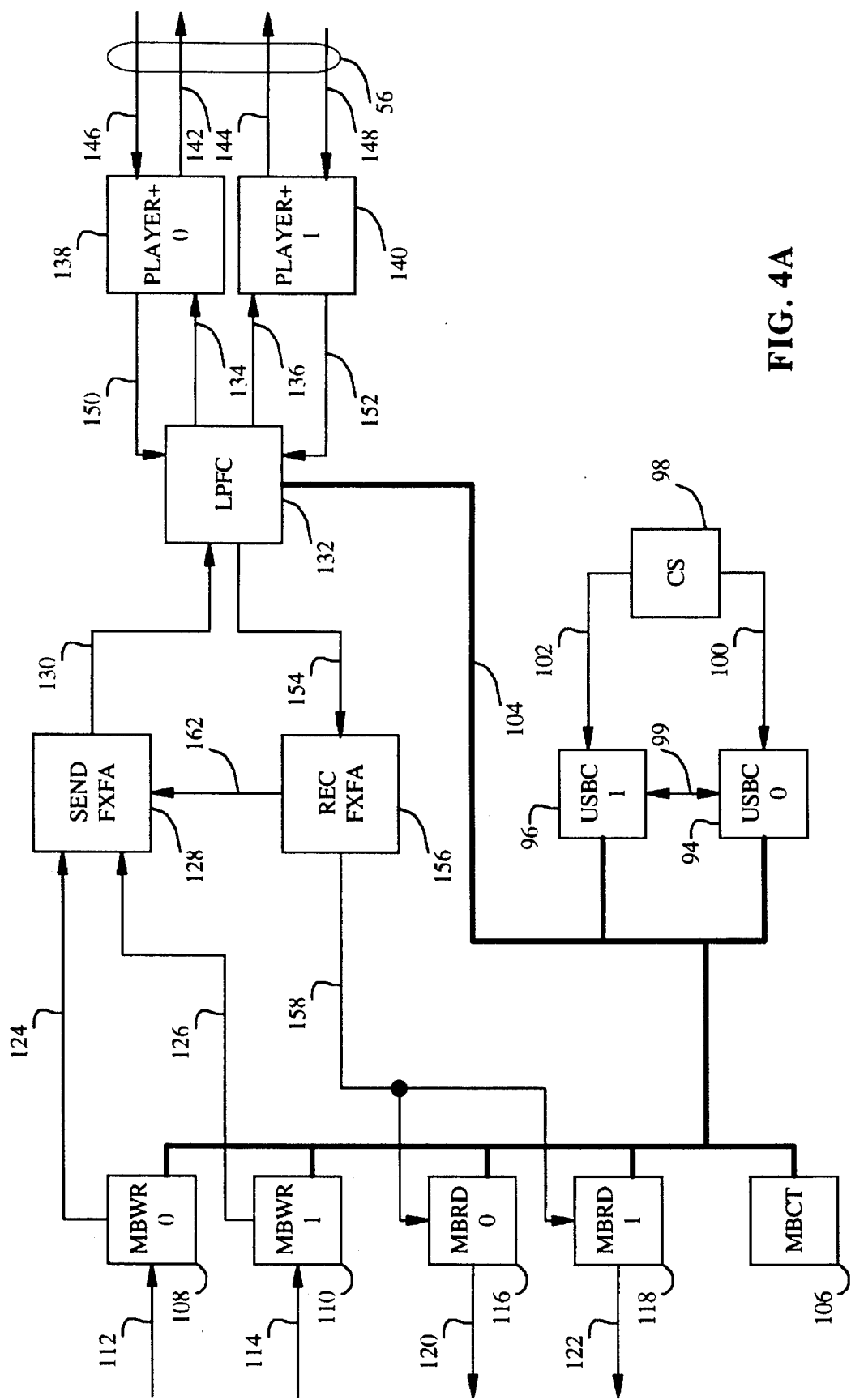
Figure 4B:
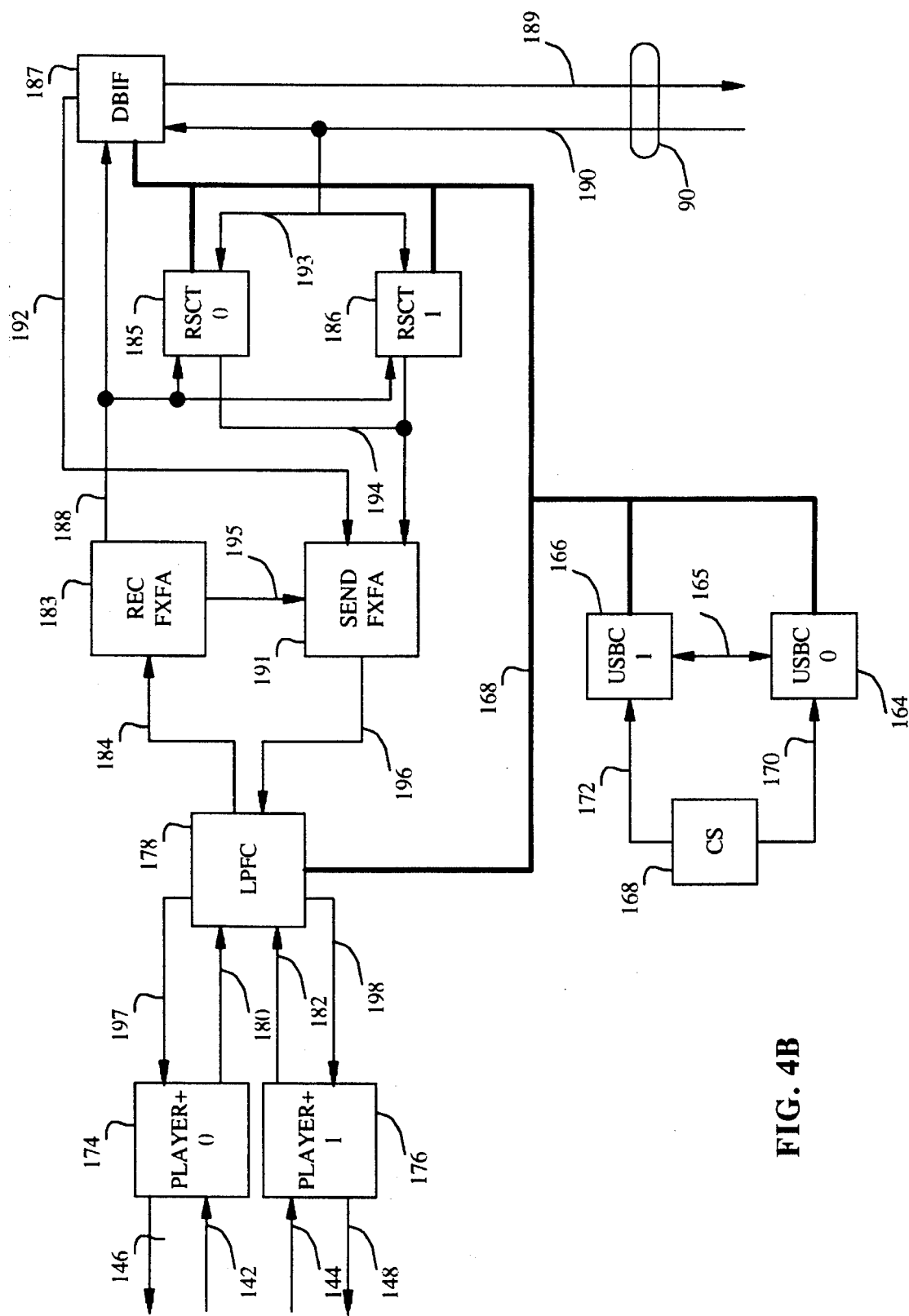

FIG. 4(A) and FIG. 4(B), when arranged as FIG. 4, are derailed block diagrams showing the components of a Data Mover and a Host Interface Adaptor. The DM and HIA exist as a pair because they are opposing ends of a communications path. The DM component 48 and the HIA component 52 are each instances of the Microsequencer Bus Controller (USBC) System. The DM 48 interfaces with the MBus 46 on the Host 12. The DM also communicates with the HIA 52 over Fiber Optic Interface 56. Thus, the DM and the HIA may be physically located some distance apart from each other, the actual distance being dependent on the length of the Fiber Optic Interface 56. The HIA 52 interfaces over Lines 90 to the Street 80.

FIG. 4(A) shows the components of a Data Mover. The architecture of the DM 48 as an instance of a Microsequencer Bus Controller System shows that there are two Microsequencer Bus Controllers (uSBCs) 94, 96 connected to a Control Store (CS) 98 via Lines 100, 102. The uSBC 0 94 and uSBC 1 96 are Reduced Instruction Set (RISC) microprocessors that control various special purpose gate arrays called Stations over the Micro Bus 104. The Micro Bus 104 is a bidirectional communications bus. The uSBCs support an instruction set with seven basic instructions in it. The instructions are of fixed length and specify either one or two operands only. The internal circuitry of the uSBCs is "hard-wired", i.e., it is not microprogrammed. The results from operations performed by uSBC 1 96 are transferred to uSBC 0 94 for error detection purposes over Line 99. The Control Store 98, consisting of seven static random access memories (SRAMs), is used to store an instruction stream that the uSBCs execute in parallel.

The M-Bus Controller (MBCT) Station 106 handles M-Bus 46 arbitration and controls data transfers between other DM Stations and the M-Bus 46. There are two DM Stations to transfer data to the M-Bus 46 and two DM Stations to transfer data from the M-Bus. The M-Bus Write (MBWR) 0 108 and MBWR 1 110 Stations receive data from the M-Bus 46 via Lines 112 and 114, respectively. The M-Bus Read (MBRD) 0 116 and MBRD 1 118 Stations send data to the M-Bus 46 via Lines 120 and 122 respectively. The MBCT 106 controls the access of these DM Stations to the M-Bus 46 over an interface (not shown) separate from the Micro Bus. Data is passed from MBWR 0 108 and MBWR 1 110 via Lines 124 and 126 to the Send Frame Transfer Facility (SEND FXFA) gate array 128. The SEND FXFA 128 packages the data into transmission packets called flames, which are passed over Line 130 to the Light Pipe Frame Control (LPFC) gate array 132. The LPFC 132 sends the frame over Lines 134 and 136 to dual PLAYER+ Physical Layer Controllers, consisting of PLAYER+ 0 138 and PLAYER+ 1 140, which are commercially available from National Semiconductor Corporation. The PLAYER+ 0 138 and PLAYER+ 1 140 transmit flames over Fiber Optic Links 142 and 144 to the HIA 52.

When the HIA 52 sends frames to the DM 48, PLAYER+ 0 138 and PLAYER+ 1 140 receive the frames over Fiber Optic Links 146 and 148. The PLAYER+ 0 138 component forwards its frame over Line 150 to the LPFC 132. Similarly, the PLAYER+ 1 140 component forwards its frame over Line 152 to the LPFC. The LPFC sends the frames via Line 154 to the Receive Frame Transfer Facility (REC FXFA) gate array 156, which unpacks the data and stores it in MBRD 0 116 and MBRD 1 118 via Line 158. The REC FXFA 156 sends an acknowledgment for the data transfer to the SEND FXFA 128 over Line 162.

FIG. 4(B) shows the components of a Host Interface Adaptor. The architecture of the HIA 52 as an instance of a Microsequencer Bus Controller System shows that there are two uSBCs 164. 166 connected to a Control Store 168 via Lines 170, 172, respectively. The uSBCs 164, 166 access the HIA Stations via the Micro Bus 168. The PLAYER+ 0 174 and PLAYER+ 1 176 components receive frames over Fiber Optic Links 142 and 144, respectively. PLAYER+ 0 174 forwards its frame to LPFC 178 over Line 180. Similarly, PLAYER+ 1 176 forwards its frame to LPFC 178 over Line 182. The LPFC 178 transfers the frames to the Receive Frame Transfer Facility (REC FXFA) 183 over Line 184. The REC FXFA 183 unpacks the frames and stores control information in the Request Status Control Table 0 (RSCT) 185 and the RSCT 1 186 Stations via Line 188. The RSCT 0 and RSCT 1 Stations monitor the data that has been received from the DM 48. The data which was contained in the frame received by the REC FXFA 183 is sent to the Database Interface (DBIF) Station 187 over Line 188. The DBIF 187 forwards the data over Line 189 to the Street 1 80.

Data received by the DBIF 187 over Line 190 from the Street 1 80 is sent to the Send Frame Transfer Facility (SEND FXFA) 191 via Line 192. Control information received over Line 190 from the Street 1 80 is sent to RSCT 0 185 and RSCT 1 186 over Line 193. The SEND FXFA 191 takes this data and control. Information from RSCT () 185 and RSCT 1 186 via Line 194 and formats a frame for transmission by the LPFC 178. Acknowledgements from REC FXFA 183 are received by SEND FXFA 191 over Line 195. The frame is forwarded over line 196 to the LPFC 178. The LPFC 178 creates two flames from the frame it received and sends one frame to PLAYER+ 0 174 over Line 197 and the other frame to PLAYER+ 1 176 over Line 198. The frames are then transmitted over the Fiber Optic Links 146 and 148 to the DM 48.

The uSBCs 94, 96, 164, 166 and the Micro Busses 104, 168 manipulate data in the system according to a hardware mode pin setting. When the mode pin is set, the Microsequencer Bus Controller System instance is a DM 48 operating on 36-bit data words in communicating with its Stations. When the mode pin is clear, the Microsequencer Bus Controller System is a HIA 52 operating on 32-bit data words in communicating with its Stations.

Figure 5:
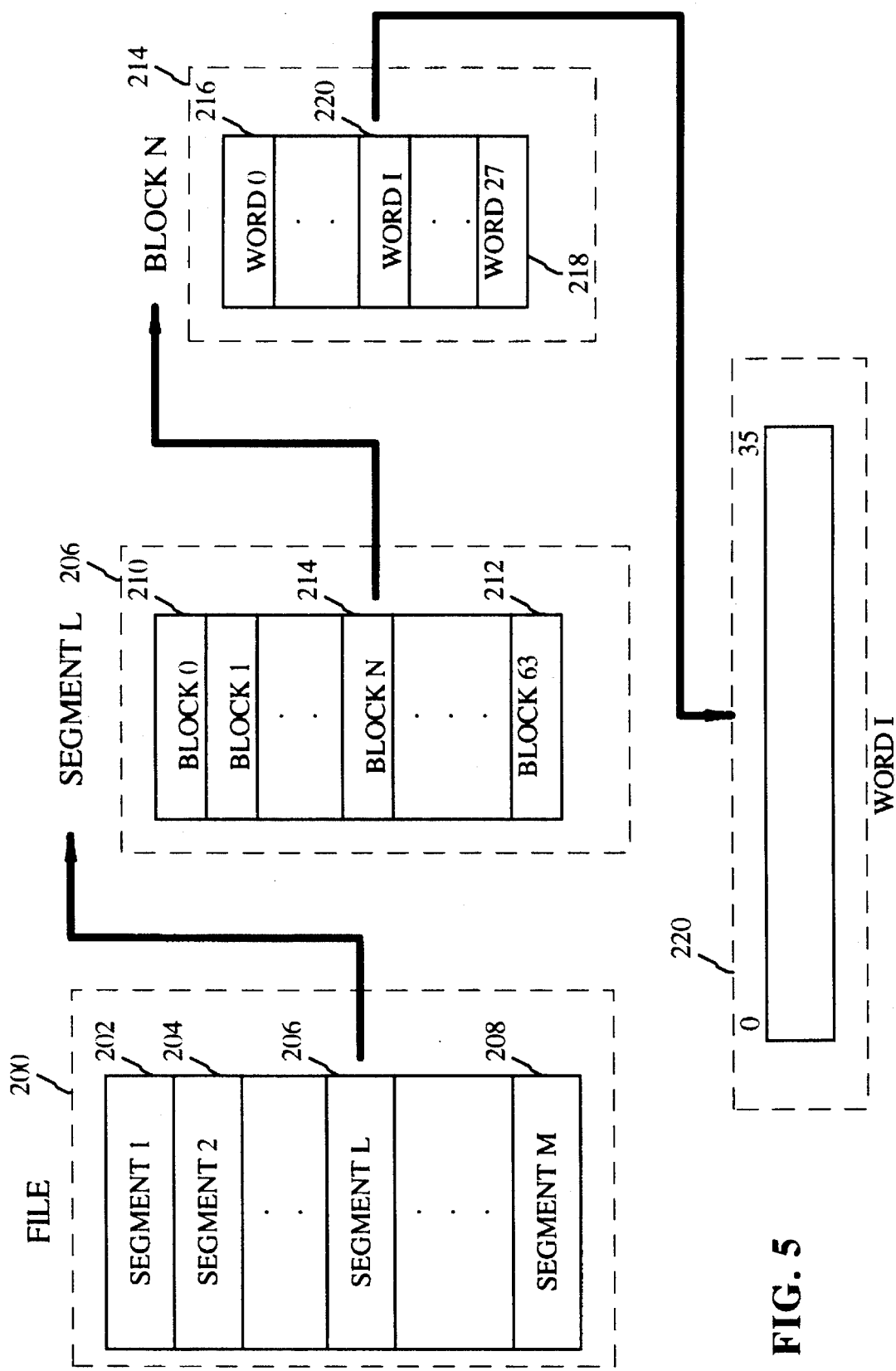
FIG. 5 is a hierarchical diagram showing the details of the Host file format hierarchy.

In the preferred embodiment, Files resident on the Host 12 system are structured as follows. Each Host File is uniquely identified by a 64-bit File ID. A File ID consists of one word containing the most significant 32 bits and one word containing the least significant 32 bits. FIG. 5 is a hierarchical diagram that shows the details of the Host file format hierarchy. A File 200 may contain one or more units of storage called segments. In the example shown in FIG. 5, the File 200 contains M segments, numbering from Segment 1 202, Segment 2 204, . . . Segment L 206, to Segment M 208. The value M is bounded only by the amount of mass storage provided by the Host. The value "L" 206 represents a File Relative Segment Offset (FRSO). A FRSO is a pointer to a segment within a file. It is stored in one word containing 32 bits. Each segment in a Host file is composed of 64 blocks. In the example, Segment L 206 contains Block 0 210 through Block 63 212. The value "N" 214 represents a Segment Relative Block Offset (SRBO). A SRBO is a six bit value indexing the 64 blocks within each segment. Each block contains 28 words. These words are numbered sequentially starting with zero and ending with 27. Zero specifies the first word in the block and 27 specifies the last word. For example, Block N 214 of Segment L 206 contains Word 0 216 through Word 27 218. Each word contains 36 bits. Thus, for some Word 1 220 in Block N 214, 36 bits of data are stored.

To reference any given location in a File, the File ID, the Segment number (FRSO), and Block number (SRBO) must be specified. Data is transferred between the Host and the File Cache System one block at a time. The storage size of data in the File Cache System 18, however, is 32 bits per word, not 36 bits per word as on the Host. Therefore, a mapping of 36-bit data words to 32-bit data words must take place when File data is stored in the NVS 70 of the File Cache System 18. FIG. 6 is a diagram that illustrates the format of each block of data in the File Cache System. The block of data formatted on the Host in 28 words of 36 bits each is packed four bit nibble by four bit nibble into blocks of data represented as 32 words of 32 bits each. Since there are 1008 bits (i.e., 28 words*36 bits per word) of data in a Host block and 1024 bits (i.e., 32 words*32 bits per word) of data in a File Cache System block, there are an extra 16 bits available in a File Cache System block. Bits 0 through 31 of words 0 through 30, and bits 0 through 15 of word 31 hold the Host data. The remaining 16 bits, bits 16 through 31 of word 31, are used to hold a Block Check Sequence (BCS) key 222.

The BCS key is used to protect File data against corruption by the File Cache System microcode or hardware and for detecting NVS storage errors. The BCS value is a 16-bit key that is generated and stored into each block when the block is written from the Host to the File Cache System. The BCS key is essentially a compressed representation of the entire block of data. When a read request for that block is received, the BCS key previously stored in the block is compared with the BCS key generated by the processing of the read request. The new BCS key is generated by using the File ID, FRSO, and SRBO supplied by the requesting process. If the values match, a successful retrieval of File data is achieved. That is, the data returned from the File Cache System came from the correct portion of File data specified by the requester's read request. If the values do not match, then the read request is attempting to reference a block of File Cache System storage which has not been allocated to the File specified in the read request. An error condition is raised and the process requesting the File data does not receive the data belonging to the specified file. The integrity of the File data is thus protected from errant stores or retrievals for the NVS. This improved error detection scheme guarantees that the requester accesses the correct File data and that the correct File data has been fetched from the NVS. Furthermore, this error is detected at the earliest possible time, before it has a chance to propagate throughout File Cache System and Host processing.

Figure 7:
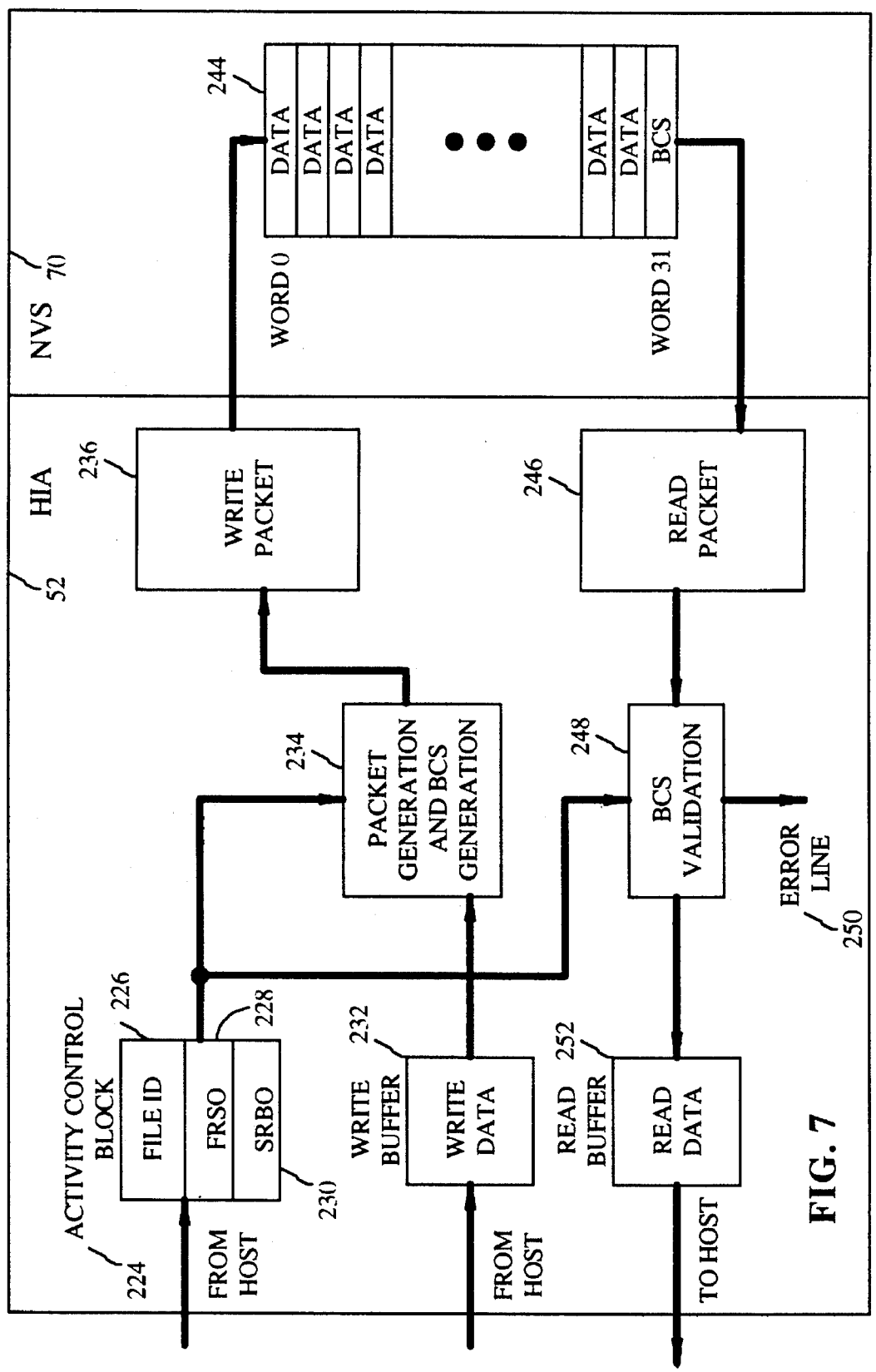
FIG. 7 is a block diagram illustrating the functional details of writing and reading blocks of data.

FIG. 7 is a block diagram illustrating the functional details of writing and reading blocks of data. The HIA 52 controls each data transfer activity. For each data transfer, an Activity Control Block (ACB) is established. The ACB is a data structure containing information specifying which data transfer (read or write) is to be performed and selecting one or more data blocks to transfer. The ACB selects a block of data to be transferred by supplying the File ID 226, the FRSO 228, and the SRBO 230. This information uniquely identifies the block of data to be written to the NVS 70 or read from the NVS 70. Up to 16 ACBs are supported. While only one ACB is shown in FIG. 7, it should be understood that there is an ACB for each activity to be performed.

Figure 8:
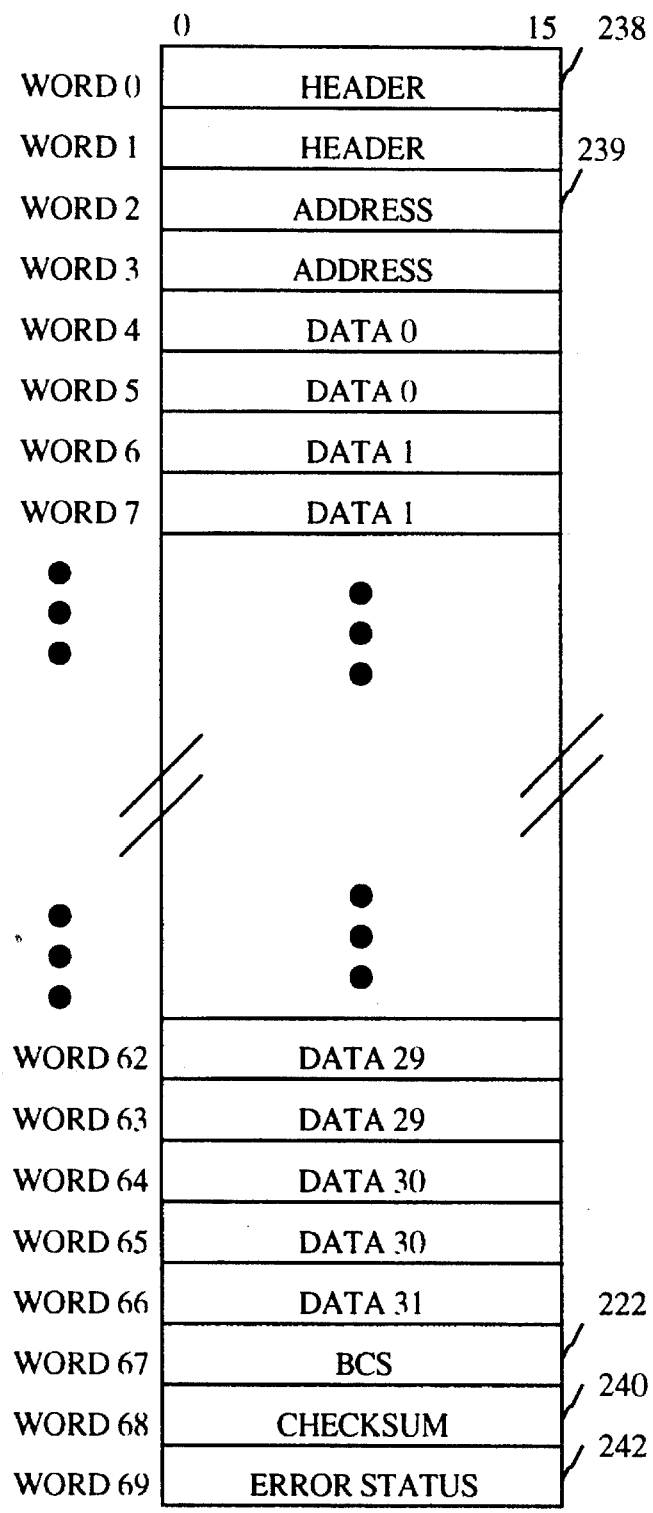
FIG. 8 is a diagram that defines the contents of a Write or Read Packet.

When the HIA 52 is performing a write operation, each block of File data to be transferred to the NVS is received from the Host 12 and stored in a Write Buffer 232. The received File data is in a suitable format for transfer over the Street 80 (not shown) to the NVS 70. Packet Generation and BCS Generation logic 234 inserts the Write Data into a Write Packet 236. FIG. 8 is a diagram that defines the contents of a Write or Read Packet. The first two 16-bit words hold Header information 238 used to route the packet through the Street 80 (not shown) to the NVS 70. For a Write Packet, the next two words hold Address information 239 used to specify which storage locations within the NVS where the data is to be stored. For a Read Packet, this information is omitted. The Address information 239 is followed by 63 words of File data. Next, the BCS 222 is stored in Word 67. A Checksum 240 and Error Status code 242 complete the Write or Read Packet. Whereas the BCS Value is computed from the File data only, the Checksum 240 is a parity sum computed from Word 1 through Word 67, thereby including the Header information 238, Address information 239 (when present), the File data, and the BCS 222. Referring back to FIG. 7, Packet Generation and BCS Generation logic 234 generates the BCS key and inserts it into the Write Packet 236. The Write Packet 236 is transferred from the HIA 52 to the NVS 70 and stored in Block 244.

When the HIA 52 is performing a read operation, a new ACB 234 populated by the read requester contains a File ID 226, FRSO 228, and SRBO 230, to identify a block of data to be read from the NVS 70. The NVS 70 retrieves the selected block of data and returns it to the HIA 52 in Read Packet 246. BCS Validation logic 248 generates a BCS key from the incoming File data from the Read Packet 246 and the ACB-supplied File ID 226, FRSO 228, and SRBO 230, and compares it to the BCS key embedded within the Read Packet 246. If the values do not match, the block of data is considered corrupted or an improper access has been requested, and Error Line 250 is activated to signify an error condition. Otherwise, the Read Packet's data is stored in Read Buffer 252 for subsequent transmission to the Host 12.

Figure 9:
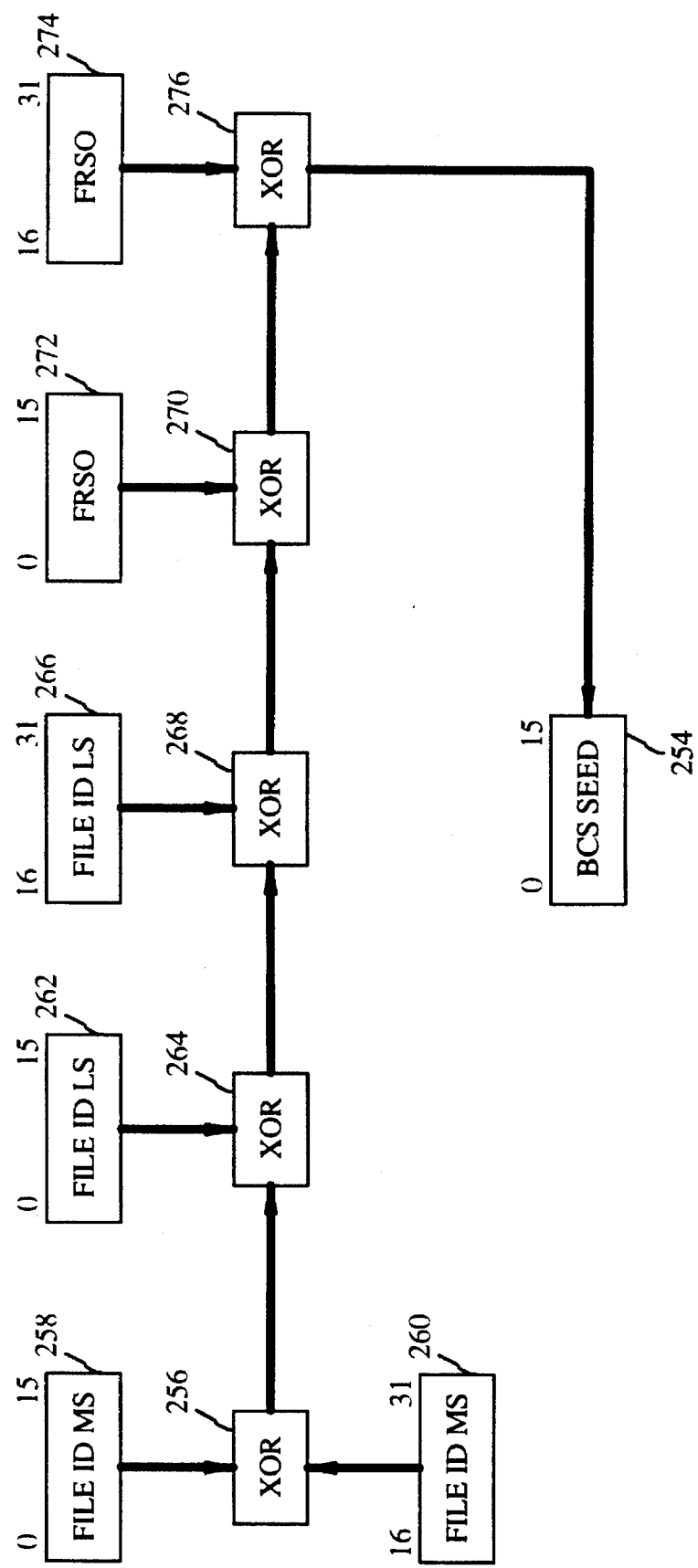
FIG. 9 is a block diagram illustrating the generation of the Block Check Sequence Seed.

The generation of the BCS key as performed by Packet Generation and BCS Generation logic 234 and BCS Validation logic 248 is as follows. Generation of the BCS key commences with the generation of a seed value by the HIA 52 microcode. FIG. 9 is a block diagram illustrating the generation of the Block Check Sequence Seed. The BCS Seed 254 is a 16-bit value constructed from a 64-bit File ID and a 32-bit File Relative Segment Offset (FRSO). The combination of the File ID and the FRSO uniquely identifies a segment of storage to be accessed. Initially, the most significant (MS) 32 bits of the File ID are combined by performing a longitudinal "exclusive-or" (XOR) operation 256 with bits 0 through 15 258 and bits 16 through 31 260. The XOR operation is used extensively in this error detection scheme because it is fast and simple. The result of XOR operation 256 is combined with bits 0 through 15 262 of the least significant (LS) 32 bits of the File ID by another XOR operation 264. This result is folded into bits 16 through 31 266 of the least significant 32 bits of the File ID by XOR operation 268. The result is passed to another XOR 270 which combines bits 0 through 15 272 of the FRSO. This result is folded into bits 16 through 31 274 of the FRSO by XOR operation 276. Finally, the result of XOR operation 276 is stored in BCS Seed 254.

Bits 29 through 31 of the FRSO are always cleared before the XOR operation 276 is performed. This setting of the FRSO must be done because in the preferred embodiment, the maximum number of segments to be transferred in a single data transfer request is eight. Thus, a modulo 8 arithmetic is used in indexing segments within a File. These three bits are, in effect, a segment counter. In a request for the transmission of multiple segments, the BCS Seed is updated each time successive data block transfers cross a segment boundary.

Figure 10:
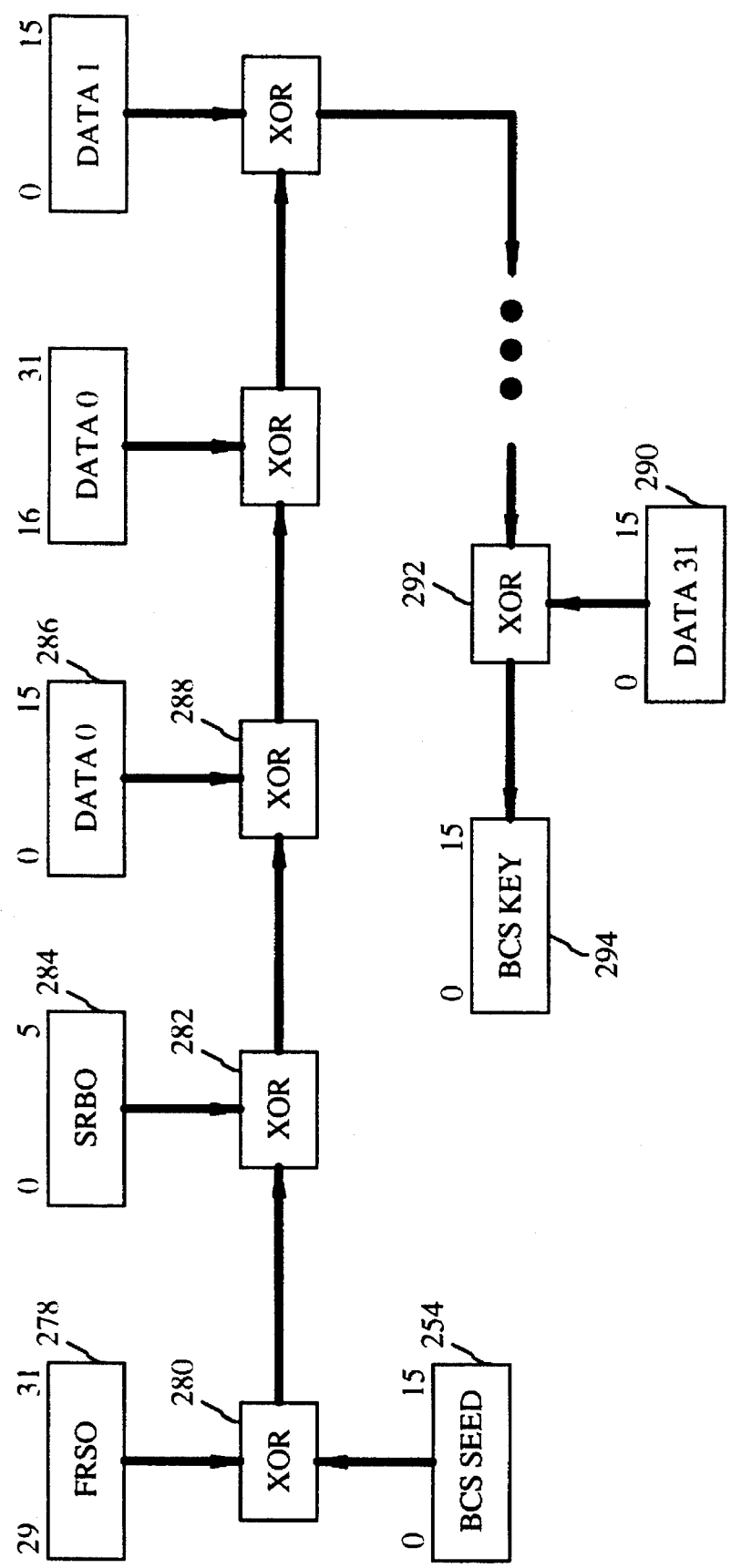
FIG. 10 is block diagram illustrating the generation of the Block Check Sequence key.

The BCS Seed 254 generated by the HIA 52 microcode is used as the basis for the BCS value, which is generated by the HIA 52 hardware. FIG. 10 is a block diagram illustrating the generation of the Block Check Sequence key. The BCS Seed 254 is combined with the least significant three bits of the FRSO 278 by XOR operation 280. These bits of the FRSO 278 are manipulated by the HIA 52 hardware as transmission requests containing multiple segments (and thus multiple blocks) are handled. These three bits of the FRSO are used to count up to eight segments that may be involved in a single data transmission request. The FRSO fragment 278 is right justified for the XOR operation 280. The result is passed to XOR operation 282 for combination with a 6-bit Segment Relative Block Offset (SRBO) value 284. The SRBO is also right justified before the XOR operation is performed. The result of this operation is then combined with the first 16-bit data word of the block (Data 0) 286 by XOR operation 288. Similarly, the remaining data words in the data block are combined using XOR's. After the last data word, Data 31 290 is combined with the previous results of the XOR pipeline by XOR operation 292, the end result is stored in BCS Key 294. The BCS Key 294 is written into the Write Packet 236 in bits 16 through 31 of data Word 31 222 as shown in FIG. 6.

This BCS Generation processing is performed when the BCS key is created for a referenced data block to be stored into the NVS, and also when the BCS key previously stored in a block retrieved from the NVS 70 is to be validated.

Figure 11:
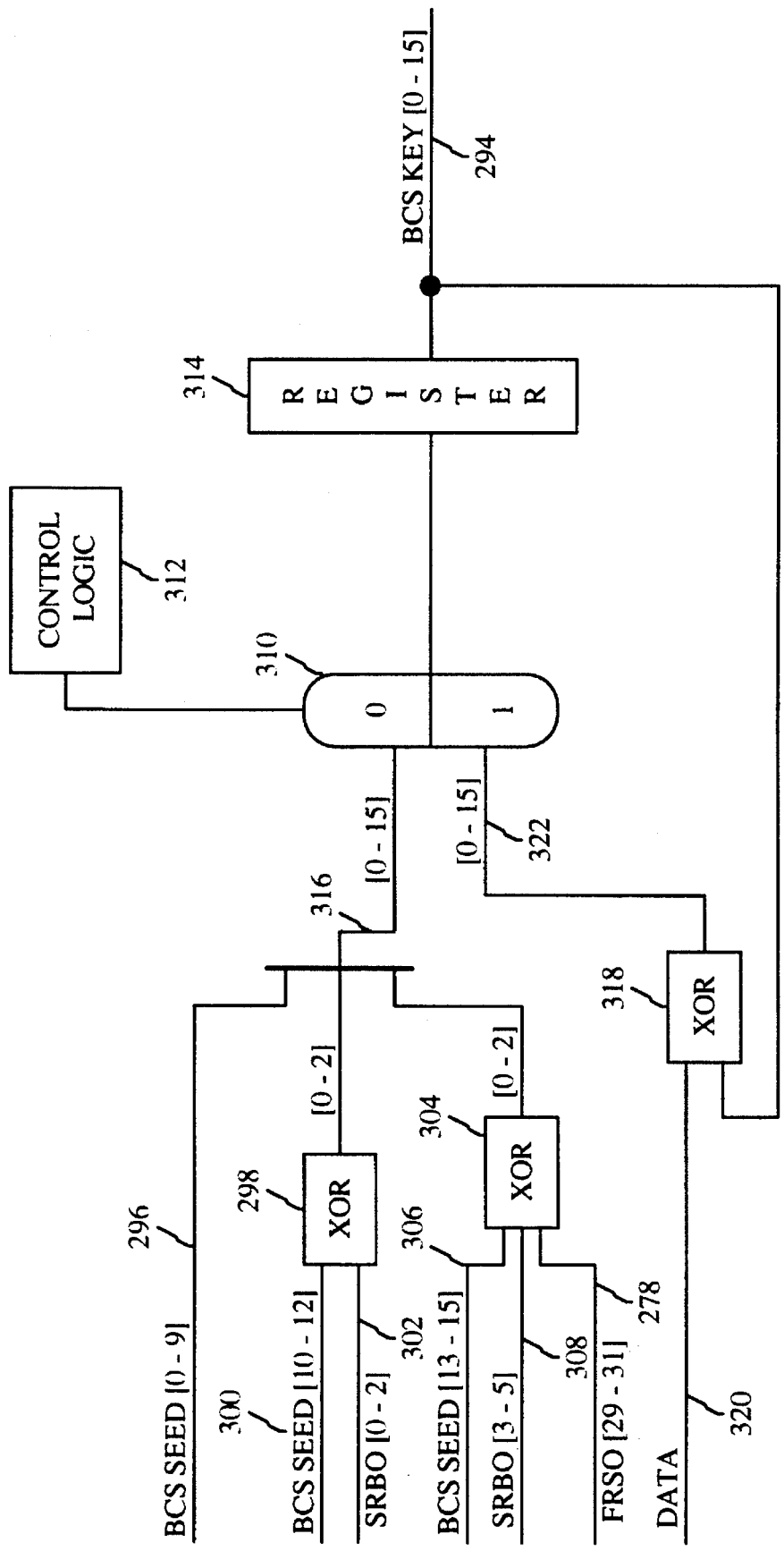
FIG. 11 is a logic diagram of the Block Check Sequence key generation logic.

FIG. 11 is a logic diagram of the BCS key generation. The BCS key generation logic exists in the HIA hardware to rapidly generate the BCS key. It is an implementation of the functionality shown above in FIG. 10. Bits 0 through 9 of the BCS Seed 296 are catenated with the two sets of 3-bit values. The first set is obtained by performing an XOR operation 298 on bits 10 through 12 of the BCS Seed 300 and bits 0 through 2 of the SRBO 302. The second set is obtained by performing an XOR operation 304 to combine bits 13 through 15 of the BCS Seed 306, bits 3 through 5 of the SRBO 308, and bits 29 through 31 of the FRSO 278. The 15 bits produced by the catenation are input to a Selector 310 controlled by Control Logic 312. For each transfer of a data block, the first loading of the Register 314 consists of the folded BCS Seed, SRBO, and FRSO combination. Thus, Selector 310 initially selects Input Path 0 316 as the source of information for Register 314. Thereafter, the value in the Register 314 is continually combined by XOR operation 318 with each successive 16-bit word of the block's data received over Data line 320. The result of the XOR operation 318 is input to the Selector 310. Control Logic 312 selects Input Path 1 322 once for each 16-bit data word in the block. The result of this longitudinal XOR operation is output on BCS Key line 294.

A system for improved error detection in data transfers between a Host processor and a File Cache System has been disclosed. By using a Block Check Sequence key embedded in each data block when the data block is stored in a Non-Volatile Storage, the system guarantees that errors occurring in the File Cache System microcode and hardware used to implement a request for retrieval of the data block will be caught at the earliest possible time. A requester of a data block is thereby assured of obtaining the correct data block from the Non-Volatile Storage. Furthermore, the implementation of the error detection scheme is efficient in its use of processing time and additional hardware needed to detect these types of errors.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A system for detecting errors occurring during storage and retrieval of file information of a file between a processor and a mass storage device, having a unit of data transfer between the processor and the mass storage device of a block of file information of a predetermined number of 32-bit words, each word containing two 16-bit half-words, the storage of file information being requested by a write requester, and the retrieval of file information being requested by a read requester, identification information of the file being specified by a plurality of 16-bit half-words, comprising:

generation means coupled to the mass storage device for generating a key representing a selected block of a file, wherein said key is generated from said selected block of said file, the identification information of said file, and identification information of said selected block supplied by the write requester, and for storing said key and said selected block of said file in the mass storage device: and validation means coupled to the mass storage device, including retrieval means for retrieving said selected block of said file and said key from the mass storage device, generating means for generating a new key representing said selected block of said file, wherein said new key is generated from said selected block retrieved from the mass storage device, the identification information of said file, and said identification information of said selected block supplied by the read requester, said validation means for comparing said new key to said key retrieved from the mass storage device, and activating an error signal when said new key does not match said key.

2. The system of claim 1, further including selecting means coupled to said generation means and said validation means for selecting said selected block of said file to be stored in or retrieved from the mass storage device by specifying the identification information of said file and said identification information of said selected block.

3. The system of claim 2, further including write buffer means coupled to the processor and said generation means for accepting said selected block of said file from the write requester in the processor, temporarily storing said selected block, and forwarding said selected block to said generation means, and read buffer means coupled to the processor and said validation means for accepting said selected block of said file from said validation means, temporarily storing said selected block, and forwarding said selected block to the read requester in the processor.

4. The system of claim 1, wherein said generation means comprises:

seed generating means for generating sixteen block check sequence initial value bits for said key from the identification information of said file; and block check sequence generating means coupled to said seed generating means for generating said key from said sixteen block check sequence initial value bits, said identification information of said selected block, and said selected block.

5. The system of claim 4, said seed generating means including means for performing a plurality of "exclusive OR" logical operations on successive 16-bit half-words of the identification information of said file.

6. The system of claim 4, said block check sequence generating means including means for performing a plurality of "exclusive OR" logical operations on said sixteen block check sequence initial value bits, said identification information of said selected block, and successive 16-bit half-words of said selected block.

7. An error detection system for detecting errors occurring during storage and retrieval of file information of a file between a mass storage device of a file cache system and a host computer system, each file containing multiple segments, each segment containing a predetermined number of blocks, each block containing a predetermined number of 32-bit data words, each word containing two 16-bit half-words, having a unit of data transfer between the file cache system and the host computer system of one block, the storage of file information being requested by a write requester, and the retrieval of file information being requested by a read requester, identification information of a file being specified by a plurality of 16-bit half-words, comprising:

block check sequence generation means coupled to the mass storage device for generating a block check sequence key representing a selected block of a selected segment of a selected file from said selected block, identification information of said selected block, identification information of said selected segment, and the identification information of said selected file supplied by the write requester, and for storing said block check sequence key and said selected block in the mass storage device; and block check sequence validation means coupled to the mass storage device, including retrieval means for retrieving said selected block and said block check sequence key from the mass storage device, generating means for generating a new block check sequence key representing said selected block, wherein said new block check sequence key is generated from said selected block retrieved from the mass storage device and said identification information of said selected block, said identification information of said selected segment, and the identification information of said selected file supplied by the read requester, said validation means for comparing said new block check sequence key to said block check sequence key retrieved from the mass storage device, and for activating an error signal when said new block check sequence key does not match said block check sequence key.

8. The system of claim 7, further including activity control buffer means coupled to said block check sequence generation means and said block check sequence validation means for selecting said block to be stored in or retrieved from the mass storage device by specifying said identification information of said selected block, said identification information of said selected segment, and the identification information of said selected file, and for specifying either a read or a write operation to be performed on said selected block.

9. The system of claim 8, further including write buffer means coupled to the host computer system and said block check sequence generation means for accepting said selected block from the host computer system, for temporarily storing said selected block, and for forwarding said selected block to said block check sequence generation means.

10. The system of claim 9, further including read buffer means coupled to the host computer system and said block check sequence validation means for accepting said selected block from said block check sequence validation means, for temporarily storing said selected block, and for forwarding said selected block to the host computer system.

11. The system of claim 7, wherein said block check sequence generation means comprises:

seed generating means for generating sixteen block check sequence initial value bits for said block check sequence key from said identification information of said selected segment and the identification information of said selected file; and block check sequence generating logic means coupled to said seed generating means for generating said block check sequence key from said sixteen block check sequence initial value bits, said identification information of said selected block, and said selected block.

12. The system of claim 11, said seed generating means including means for performing a plurality of "exclusive OR" logical operations on successive 16-bit half-words of the identification information of said file.

13. The system of claim 11, said block check sequence generating logic means including means for performing a plurality of "exclusive OR" logical operations on said sixteen block check sequence initial value bits, said identification information of said selected block, and successive 16-bit half-words of said selected block.

14. An error detection system for detecting errors occurring during storage and retrieval of file information of a file between a mass storage device of a file cache system and a host computer system, each file containing multiple segments, each segment containing a predetermined number of blocks and being referenced by a file relative segment offset, each block containing a predetermined number of 32-bit data words, each 32-bit data word containing two 16-bit half-words, having a unit of data transfer between the file cache system and the host computer system of one block, the storage of file information being requested by a write requester, and the retrieval of file information being requested by a read requester, identification information of a file being specified by a plurality of 16-bit half-words, comprising:

block check sequence generation circuitry coupled to the mass storage device;

block check sequence validation circuitry coupled to the mass storage device;

an activity control buffer coupled to said block check sequence generation circuitry and said block check sequence validation circuitry to select said block to be stored in or retrieved from the mass storage device by specifying identification information of said selected block, identification information of said selected segment, and the identification information of said selected file, and to specify either a read or a write operation to be performed on said selected block;

a write buffer coupled to the host computer system and said block check sequence generation circuitry to accept said selected block from the host computer system, to temporarily store said selected block, and to forward said selected block to said block check sequence generation circuitry; and a read buffer coupled to the host computer system and said block check sequence validation circuitry to accept said selected block from said block check sequence validation circuitry, to temporarily store said selected block, and to forward said selected block to the host computer system.

15. The system of claim 14, wherein said block check sequence generation circuitry comprises:

seed generating logic coupled to said activity control buffer; and block check sequence generating logic coupled to said seed generating logic, said activity control buffer, and said write buffer.

16. The system of claim 15, wherein said seed generating logic comprises:

a first "exclusive OR" gate coupled to said activity control buffer to accept as inputs a first two 16-bit half-words of the identification information of said selected file;

a second "exclusive OR" gate coupled to said activity control buffer and to said first "exclusive OR" gate to accept as input the output of said first "exclusive OR" gate and a third 16-bit half-word of the identification information of said selected file;

a third "exclusive OR" gate coupled to said activity control buffer and to said second "exclusive OR" gate to accept as input the output of said second "exclusive OR" gate and a fourth 16-bit half-word of the identification information of said selected file;

a fourth "exclusive OR" gate coupled to said activity control buffer and to said third "exclusive OR" gate to accept as input the output of said third "exclusive OR" gate and a lower 16-bit half-word of the file relative segment offset;

a fifth "exclusive OR" gate coupled to said activity control buffer and to said fourth "exclusive OR" gate to accept as input the output of said fourth "exclusive OR" gate and an upper 16-bit half-word of the file relative segment offset; and a register coupled to said fifth "exclusive OR" gate and said block check sequence generating logic to store a 16-bit block check sequence initial value.

17. The system of claim 15, wherein said block check sequence generating logic comprises:

a first "exclusive OR" gate coupled to said seed generating logic and said activity control buffer to accept as input said identification information of said selected segment and output signals from said seed generating logic;

a second "exclusive OR" gate coupled to said seed generating logic and said activity control buffer to accept as input said output signals from said seed generating logic, said identification information of said selected block, and the identification information of said selected file;

a third "exclusive OR" gate coupled to said write buffer to accept as input successive 16-bit half-words of said selected block from said write buffer and interim block check sequence signals transferred over a feedback line;

a selector, coupled to the catenated output of said first "exclusive OR" gate, said second "exclusive OR" gate, and said output of said seed generating logic, and coupled to the output of said third "exclusive OR" gate;

control logic coupled to said selector to select said catenated output for the first execution of said block check sequence generating logic for the current storage or retrieval operation, and to select said output of said third "exclusive OR" gate thereafter;

a register coupled to said selector for holding said interim block check sequence signals before transfer on said feedback line to said third "exclusive OR" gate; and block check sequence key lines coupled to said register and said mass storage device to transmit final block check sequence signals to said mass storage device.

18. A method for detecting errors occurring during storage and retrieval of file information of a file between a mass storage device and a processor, having a unit of data transfer between the mass storage device and the processor of a block of file information of a predetermined number of file data words, the storage of file information being requested by a write requester, the retrieval of file information being requested by a read requester, comprising the steps of:

(a) generating upon request by the write requester a key representing a selected block of a file, wherein said key is generated from said selected block of said file, and identification information of said file and said selected block supplied by the write requester;

(b) storing said key and said selected block of said file in the mass storage device;

(c) retrieving upon request by the read requester said selected block of said file and said key from the mass storage device;

(d) generating a new key representing said selected block, wherein said new key is generated from said selected block retrieved from the mass storage device, and identification information of said file and said selected block supplied by the read requester;

(e) comparing said new key to said key retrieved from the mass storage device; and (f) activating an error signal when said new key does not match said key.

19. An error detecting method for detecting errors occurring during storage and retrieval of file information of a file between a mass storage device of a file cache system and a host computer system, each file containing multiple segments, each segment containing a predetermined number of blocks, each block containing a predetermined number of data words, having a unit of data transfer between the file cache system and the host computer system of one block, the storage of file information being requested by a write requester, and the retrieval of file information being requested by a read requester, comprising:

(a) generating upon request by a write requester a block check sequence key representing a selected block of a selected segment of a selected file, wherein said block check sequence key is generated from said selected block, and identification information of said selected block, said selected segment, and said selected file supplied by the write requester;

(b) storing said block check sequence key and said selected block in the mass storage device;

(c) retrieving upon request by a read requester said selected block and said block check sequence key from the mass storage device;

(d) generating a new block check sequence key representing said selected block, wherein said new block check sequence key is generated from said selected block retrieved from the mass storage device, and identification information of said selected block, said selected segment, and said selected file supplied by the read requester;

(e) comparing said new block check sequence key to said block check sequence key retrieved from the mass storage device; and (f) activating an error signal when said new block check sequence key does not match said block check sequence key.

20. The method of claim 19, wherein said generating a block check sequence key step comprises the steps of:

(a1) generating a block check sequence seed by performing a plurality of "exclusive OR" logical operations on successive 16-bit half-words of said selected file identification information and said selected segment identification information; and (a2) generating a block check sequence key by performing a plurality of "exclusive OR" logical operations on said block check sequence seed, said selected segment identification information, said selected block identification information, and successive 16-bit half-words of said selected block.

* * * * *